United States Patent
Malloy et al.

(10) Patent No.: US 12,325,301 B2
(45) Date of Patent: Jun. 10, 2025

(54) HYBRID INDUSTRIAL MACHINE POWERTRAIN

(71) Applicant: Twin Disc, Inc., Racine, WI (US)

(72) Inventors: Ryan Malloy, Milwaukee, WI (US); Andrew Conaty, West Allis, WI (US)

(73) Assignee: Twin Disc, Inc., Racine, WI (US)

( * ) Notice: Subject to any disclaimer, the term of this patent is extended or adjusted under 35 U.S.C. 154(b) by 0 days.

(21) Appl. No.: 18/133,057

(22) Filed: Apr. 11, 2023

(65) Prior Publication Data
US 2023/0322075 A1    Oct. 12, 2023

Related U.S. Application Data

(60) Provisional application No. 63/329,610, filed on Apr. 11, 2022.

(51) Int. Cl.
| | |
|---|---|
| *B60K 25/06* | (2006.01) |
| *B60K 6/383* | (2007.10) |
| *B60K 6/442* | (2007.10) |
| *H02K 7/00* | (2006.01) |
| *B60K 25/00* | (2006.01) |

(52) U.S. Cl.
CPC ............. *B60K 25/06* (2013.01); *B60K 6/383* (2013.01); *B60K 6/442* (2013.01); *H02K 7/006* (2013.01); *B60K 2025/005* (2013.01); *B60Y 2200/92* (2013.01); *B60Y 2300/51* (2013.01)

(58) Field of Classification Search
CPC .......... B60Y 2300/51; B60K 2025/005; B60K 6/442; B60K 6/383; B60K 25/06; H02K 7/006
See application file for complete search history.

(56) References Cited

U.S. PATENT DOCUMENTS

| | | | | |
|---|---|---|---|---|
| 5,562,565 A | * | 10/1996 | Moroto | B60K 6/365 903/952 |
| 6,843,751 B2 | * | 1/2005 | Yang | B60K 6/445 477/3 |
| 8,996,214 B2 | * | 3/2015 | Ishii | B60K 6/543 701/55 |
| 9,656,541 B2 | * | 5/2017 | True | B60K 6/442 |
| 10,760,624 B1 | * | 9/2020 | Samie | F16H 41/04 |
| 10,933,743 B2 | * | 3/2021 | Singh | B60K 6/383 |

(Continued)

FOREIGN PATENT DOCUMENTS

| | | | | |
|---|---|---|---|---|
| CN | 202130568 U | | 2/2012 | |
| CN | 102712316 A | * | 10/2012 | ............. B60K 25/00 |

(Continued)

*Primary Examiner* — Paul N Dickson
*Assistant Examiner* — Maxwell L Meshaka
(74) *Attorney, Agent, or Firm* — Boyle Frederickson S.C

(57) ABSTRACT

An industrial machine is provided that includes a hybrid powertrain. The hybrid powertrain includes a PTI/PTO (power-take-in/power-take-off) system that can passively decouple an internal combustion engine from other powertrain components. The hybrid powertrain allows the industrial machine to operate in power delivering modes, in which an internal combustion engine and/or an electric motor(s) are prime movers, a fully electric mode in which the electric motor(s) is the prime mover(s), and power generating modes, in which either the internal combustion engine or load inertia drives the electric motor(s) as an electrical power generator.

9 Claims, 15 Drawing Sheets

(56) References Cited

U.S. PATENT DOCUMENTS

| | | | |
|---|---|---|---|
| 11,124,066 B2* | 9/2021 | Weflen | F15B 21/001 |
| 11,225,240 B2* | 1/2022 | Dalum | B60K 25/02 |
| 11,280,247 B2* | 3/2022 | Kokot | F02B 63/06 |
| 11,351,854 B2* | 6/2022 | Gerty | B60K 6/48 |
| 11,787,280 B2* | 10/2023 | Gerty | B60K 17/02 |
| | | | 701/53 |
| 11,912,119 B2* | 2/2024 | Van Dingenen | B60K 25/06 |
| 11,919,502 B2* | 3/2024 | Shively | B60K 6/24 |
| 2003/0078135 A1* | 4/2003 | Yang | B60K 6/48 |
| | | | 903/912 |
| 2013/0066496 A1* | 3/2013 | Ishii | B60W 10/30 |
| | | | 903/930 |
| 2015/0008057 A1 | 1/2015 | Lo | |
| 2016/0068053 A1* | 3/2016 | True | B60W 10/02 |
| | | | 180/65.23 |
| 2017/0355373 A1* | 12/2017 | Dalum | F16H 61/0031 |
| 2019/0077259 A1* | 3/2019 | Singh | B60K 25/06 |
| 2020/0039349 A1* | 2/2020 | Weflen | F15B 21/001 |
| 2020/0408293 A1* | 12/2020 | Sugimoto | B60K 6/40 |
| 2021/0033020 A1* | 2/2021 | Kokot | F02G 5/00 |
| 2021/0260981 A1* | 8/2021 | Gerty | B60K 17/02 |
| 2021/0379978 A1* | 12/2021 | Van Dingenen | B60K 1/02 |
| 2022/0402347 A1* | 12/2022 | Gerty | B60K 17/02 |
| 2023/0322063 A1* | 10/2023 | Van Dingenen | B60K 25/00 |
| | | | 74/661 |
| 2023/0322075 A1* | 10/2023 | Malloy | B60K 6/383 |
| | | | 180/53.4 |

FOREIGN PATENT DOCUMENTS

| | | | | |
|---|---|---|---|---|
| CN | 114194020 A | | 3/2022 | |
| DE | 102018219211 A1 | * | 5/2020 | |
| DE | 102021120785 A1 | * | 3/2022 | |
| DE | 102022204752 A1 | * | 11/2023 | |
| JP | 2010221946 A | | 10/2010 | |
| WO | WO-2020074340 A1 | * | 4/2020 | B60K 1/02 |
| WO | 2021072123 A1 | | 4/2021 | |
| WO | WO-2022237478 A1 | * | 11/2022 | B60K 25/06 |

* cited by examiner

STATE CHART

| MODE | | IC Eng Active | | Motor/Gen Active | |
|---|---|---|---|---|---|
| | | Y | N | Y | N |
| Power Delivery | IC | X | | | X |
| | Elect | | X | X | |
| | Hyb | X | | X | |
| Power Generation | IC | X | | X | |
| | Load/Braking | | X | X | |

FIG. 8

HYBRID INDUSTRIAL MACHINE POWERTRAIN

CROSS-REFERENCE TO RELATED APPLICATIONS

This application claims priority to U.S. Provisional Patent Application No. 63/329,610, filed on Apr. 11, 2022, and entitled "Hybrid Industrial Machine Powertrain", the entirety of which is expressly incorporated by reference herein.

BACKGROUND OF THE INVENTION

Field of the Invention

The preferred embodiments relate generally to the field of industrial powertrain systems and, more specifically, to a hybrid industrial powertrain.

Discussion of the Related Art

The electrification and electric hybridization of powertrains is growing increasingly popular. Although numerous prevalent examples can be seen in the automotive industry, numerous challenges exist in the hybridization of power transmission for industrial powertrains of other machines, including off-highway machines, mobile equipment and stationary equipment, such as, for example, cranes and other material handling equipment, wood chippers and other recycling or processing equipment, rock crushers and other construction equipment, and industrial accessory equipment or machines such as municipal and airport industrial snow throwers with auxiliary IC (internal combustion) engines.

Many of these industrial machines have limited space in their powertrain compartments because of practical size constraints for the overall machines, especially those that are mobile. The powertrain compartments must house industrial IC engines, some of which are relatively large with high horsepower ratings of hundreds or more than one thousand horsepower, depending on the particular power requirements for the machines' working systems. Besides the industrial IC engines, the powertrain compartments of these machines also house major components of hydraulic systems and other power transmitting systems that deliver power to the machines' working systems.

Typical electric hybrid powertrain systems have electric motors that are sized or have power ratings based on the size or power rating of the IC engine they compliment. Accordingly, a large industrial IC engine would require a large electric motor as a complimentary prime mover in a hybrid industrial machine powertrain. Not only do large electric motors occupy a lot of space, but they can require high inrush or starting currents to urge the motor begin rotating. Control systems that can manage high inrush starting currents can be complex and expensive.

Typical electric hybrid powertrain systems have master clutches or selectively engageable transmissions for switching between IC engine-powered and electric-powered modes. These extra components add to the overall size of the hybrid powertrain system and add complexity to the control methodology of the hybrid powertrain system.

What is therefore needed is a system that allows for electric hybridization of an industrial machine powertrain that minimizes space occupied by an electric motor and can be implemented with straight-forward and cost-effective controls.

SUMMARY AND OBJECTS OF THE INVENTION

The preferred embodiments overcome the above-noted drawbacks by providing a hybrid industrial machine with a passive clutching system to allow switching between operational modes without requiring active clutch or transmission control and that has its hybrid components housed within substantially the same sized powertrain compartments as a non-hybrid version of the machine. This may be implemented as a hybrid industrial machine powertrain with a one-way clutch integrated in a coupler that directly connects an IC engine and a PTI/PTO (power-take-in/power-take-off) gearbox.

In some implementations, the PTI/PTO gearbox may provide power flow paths for delivering power to a hydraulic system. In such implementations, at least one electric motor and a pump drive may be connected to the PTI/PTO gearbox, downstream of the IC engine. The PTI/PTO gearbox may occupy a relatively small footprint within an engine compartment with a tower configuration that mounts multiple various components such as electric motor(s), pump drive, and/or hydraulic pump(s) to the single tower.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical embodiments of the present invention, will become more readily apparent by referring to the exemplary and, therefore, non-limiting, embodiments illustrated in the drawings accompanying and forming a part of this specification, wherein like reference numerals designate the same elements in the several views, and in which:

FIG. 8 is a state chart illustrating different operational states of a hybrid industrial machine powertrain, according to the preferred embodiments.

Figure 1:
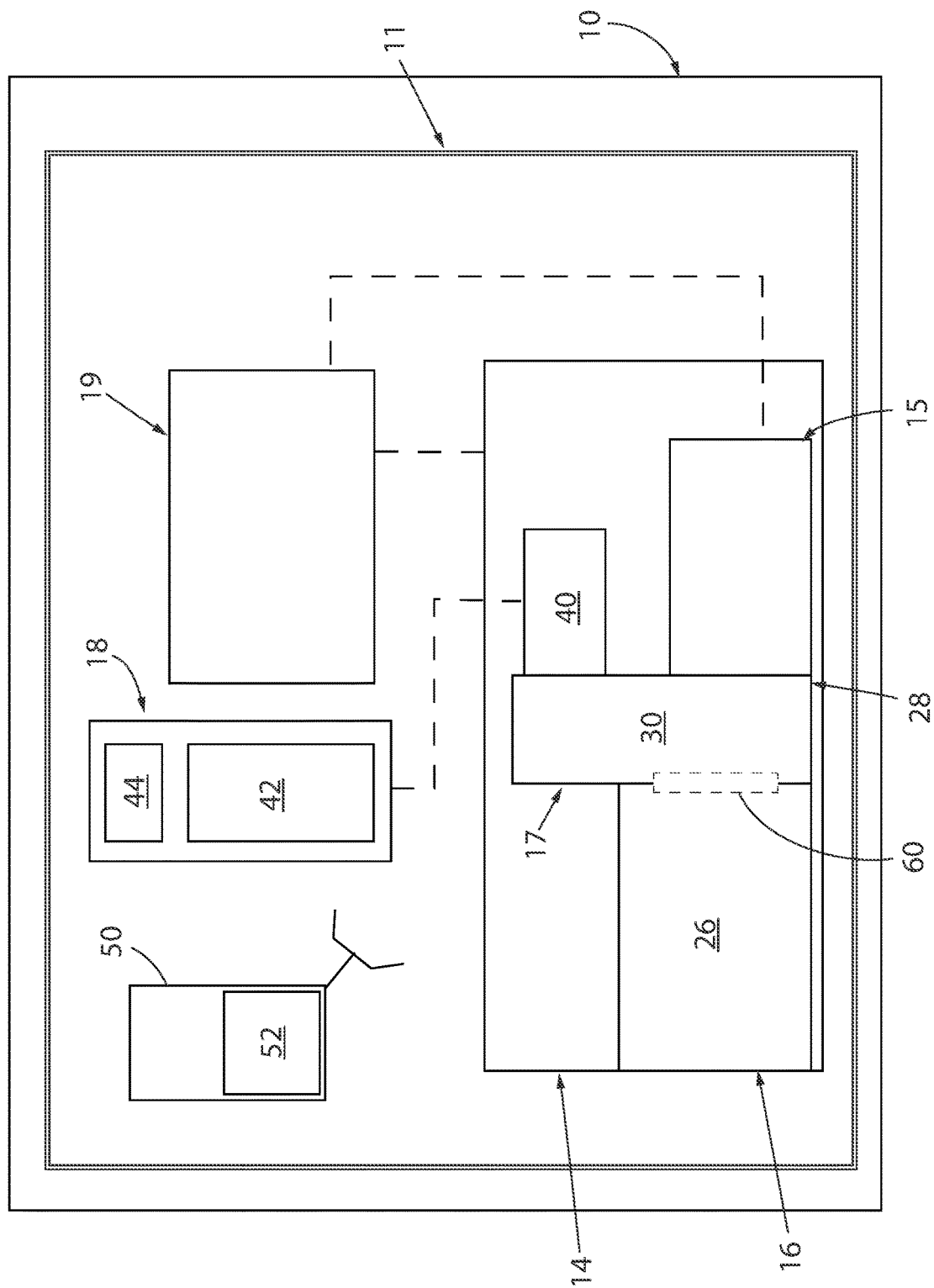
FIG. 1 is a schematic illustration of an industrial machine incorporating a hybrid powertrain, according to a preferred embodiment.

In describing preferred embodiments of the invention, which are illustrated in the drawings, specific terminology will be resorted to for the sake of clarity. However, it is not intended that the invention be limited to the specific terms so selected, and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Referring to FIG. 1, one embodiment of the invention is a hybrid powertrain for an industrial machine, shown as machine 10. Machine 10 is typically a heavy-duty or industrial machine powered by a heavy-duty or industrial engine. Machine 10 may include those that are self-propelled with their own drivetrains such as cranes, mining trucks, logging equipment, material handling equipment, firefighting and other vehicles. Other examples of machines 10 include those that may be towed or stationary and that are configured to perform work, including, for example, wood chippers and other recycling or processing equipment, rock crushers and other construction equipment, and industrial accessory equipment or machines such as municipal and airport industrial snow throwers.

Still referring to FIG. 1, machine 10 has various cooperating systems, with self-propelled implementations of machine 10 having drivetrains 11, which include vehicle-type chassis and that support hybrid powertrain systems 14. Powertrain system 14 includes an IC engine system 16, a hybrid PTI/PTO (power-take-in/power-take-off) system 17, and an electrical system 18. The power from the hybrid powertrain system 14 may be delivered through a transmission 15 to various drivetrain 11 components for moving the self-propelled machine 10, such as driveshafts or propeller shafts that transmit torque to driven axles or other driven components. Other systems, such as working system 19, may receive power from transmission 15 for performing tasks other than propelling the machine 10. Instead of or in addition to receiving power from transmission 15, working system 19 may receive power from various components of hybrid powertrain system 14.

Figure 2:
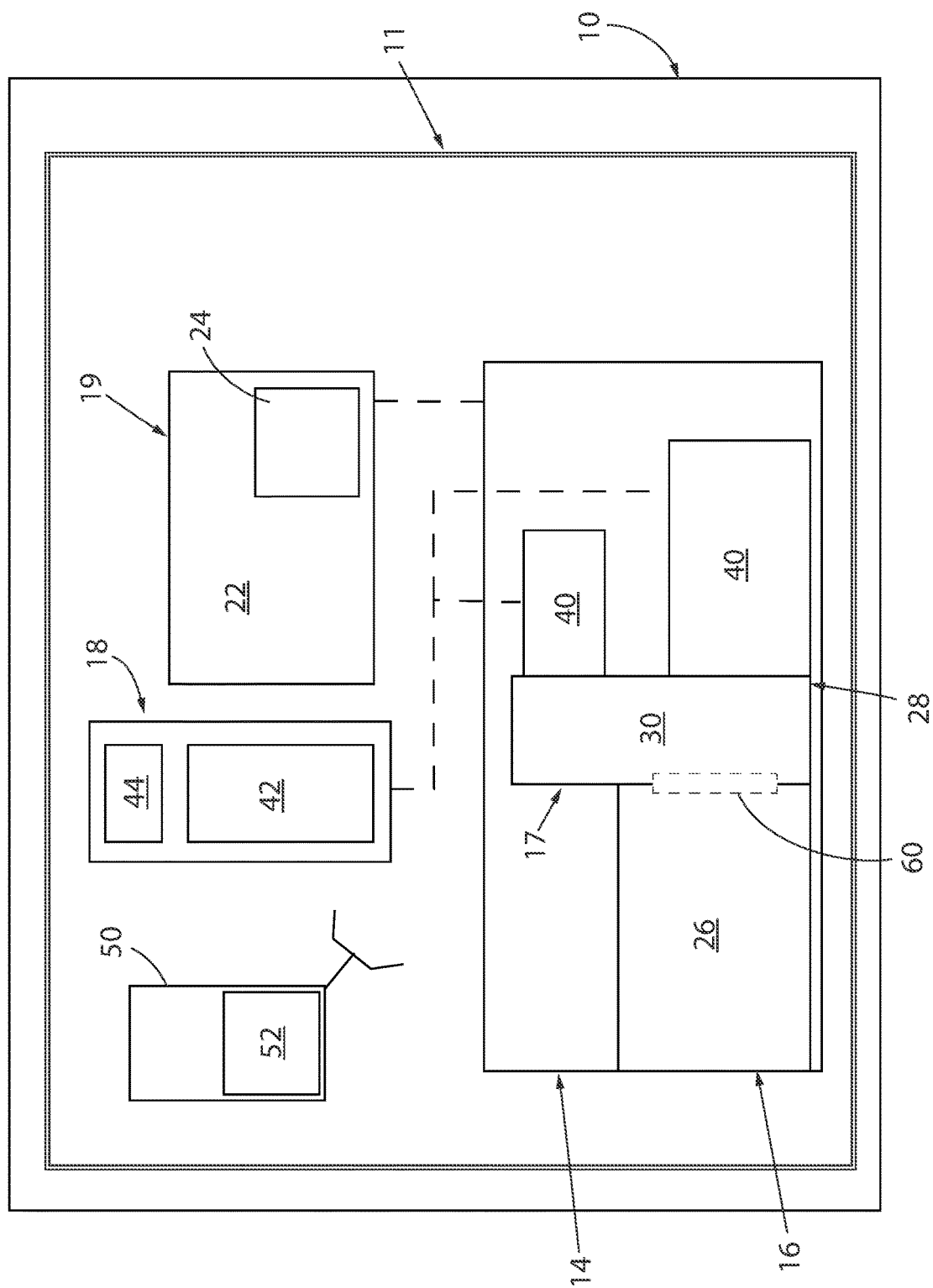
FIG. 2 is a schematic illustration of a hybrid powertrain system, according to another preferred embodiment.

Still now to FIG. 2, working system 19 may include a tool(s) or component(s) 22 that is actuated, rotated, or otherwise moved by a drive 24 and is configured to perform a task(s) that corresponds to the particular type of machine. Examples include winding drum systems, boom control systems, and turret rotating systems for cranes, feed systems and cutting systems for wood chippers, and auger systems, impeller systems, and chute systems for industrial snow throwers.

Still referring to FIG. 2, IC engine system 16 includes an industrial IC engine, shown as engine 26 that cooperates with the hybrid PTI/PTO system 17. The hybrid PTI/PTO system includes a hybrid drive 28 with a PTI/PTO gearbox 30 that is connected to and selectively receives power from engine 26 of the IC engine system 16 and at least one electric motor(s) 40 of the electrical system 18. Hybrid drive 28 may deliver power to the working system's drive 24 by way of, for example, geartrains, rotating shafts, or hydraulic power.

Figure 3:
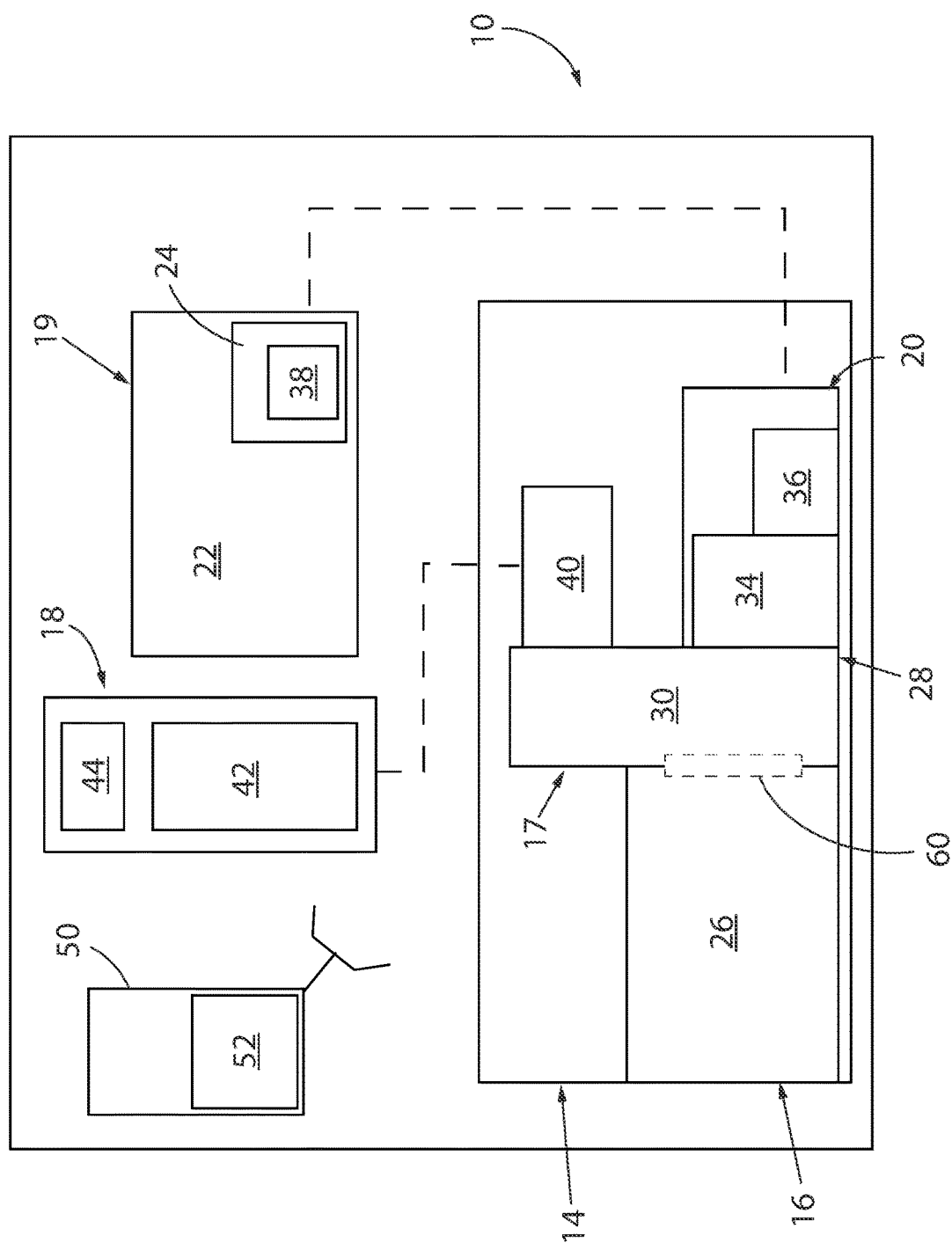
FIG. 3 is a schematic illustration of a hybrid powertrain system, according to another preferred embodiment.

Referring now to FIG. 3, hydraulic system 20 is shown connected to an output end of the PTI/PTO gearbox 30 by way of pump drive 34, which delivers the power to at least one hydraulic pump(s) 36 that pressurizes hydraulic fluid for use by hydraulic system 20. When the working system's drive 24 includes a hydraulic motor 38, the hydraulic pump(s) 36 is fluidly connected to the hydraulic motor 38 to rotate the hydraulic motor 38 to provide actuation, rotation, or other movement to the tool(s) or component(s) 22 or various accessories of working system 19, to perform the machine's work.

Figure 4:
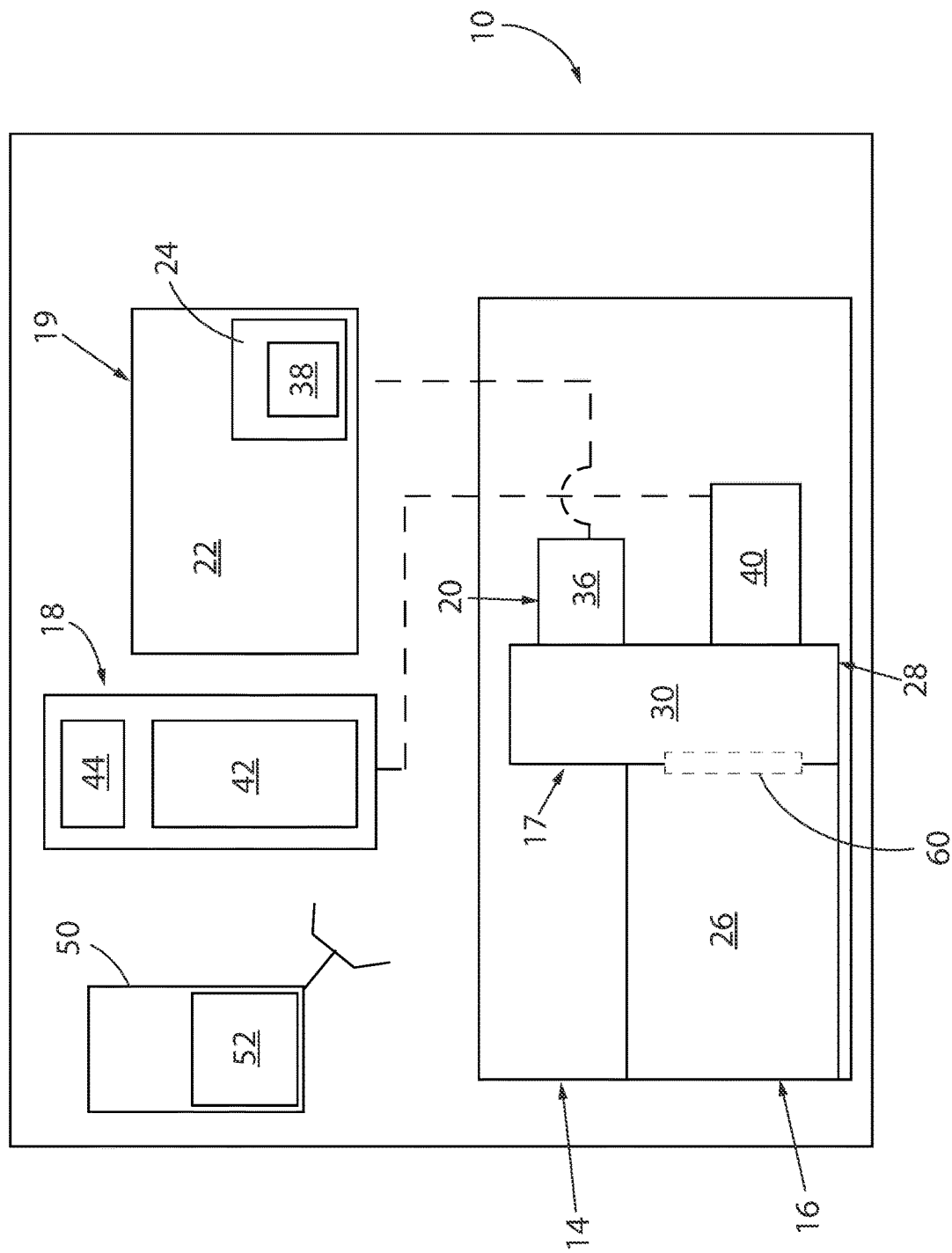
FIG. 4 is a schematic illustration of a hybrid powertrain system, according to another preferred embodiment.

Referring now to FIG. 4, machine 10 is substantially the same as that shown in FIG. 3, only with a different arrangement of various components in the electrical system 18 and hydraulic system 20. Electric motor 40 is shown here connected to a main output or through drive of the hybrid PTI/PTO system's PTI/PTO gearbox 30 and hydraulic pump 36 is shown as mounted to an auxiliary-type output of the PTI/PTO gearbox 30.

Referring now to FIGS. 1-4, electrical system 18 includes at least one electric motor(s) 40 that is connected to the PTI/PTO gearbox 30, as a supplemental prime mover(s), in addition to engine 26. A battery 42 of electrical system 18 provides a DC power source usable by the electrical system 18 and is typically implemented as a bank of multiple interconnected cells or batteries, which may include lithium-ion batteries or various lead and electrolyte configurations such as AGM (absorbent glass mat) sealed batteries. When the electric motor(s) 40 is an AC motor, the electrical system 18 further includes an inverter and related hardware and corresponding software for converting the DC power from the battery 42 into AC power for use by the electric motor(s) 40. A BMS (battery management system) 44 is operably connected to battery 42. The BMS 44 typically includes a charger and control components for monitoring and establishing and/or maintaining the battery's 42 charge state or other performance characteristics. BMS 44 has circuitry that includes corresponding hardware, firmware, and/or software, as well as conductors or other components for power and data or signal transmission that cooperate to monitor operational parameters of battery 42 and/or control various system functions to attenuate deviations from acceptable target values or ranges for the battery's 42 operating parameters, such as temperature, voltage, charge state, and others. BMS 44 may be implemented as a standalone system that manages battery 42 or as part of an overall control system, shown here as control system 50.

Still referring to FIGS. 1-4, control system 50 may include a controller 52 such as a computer that executes various stored programs while receiving inputs from and sending commands to control various subsystems or components in the working system 19 and hybrid power system 14 and its IC engine system 16, electrical system 18, and hydraulic system 20.

Figure 5:
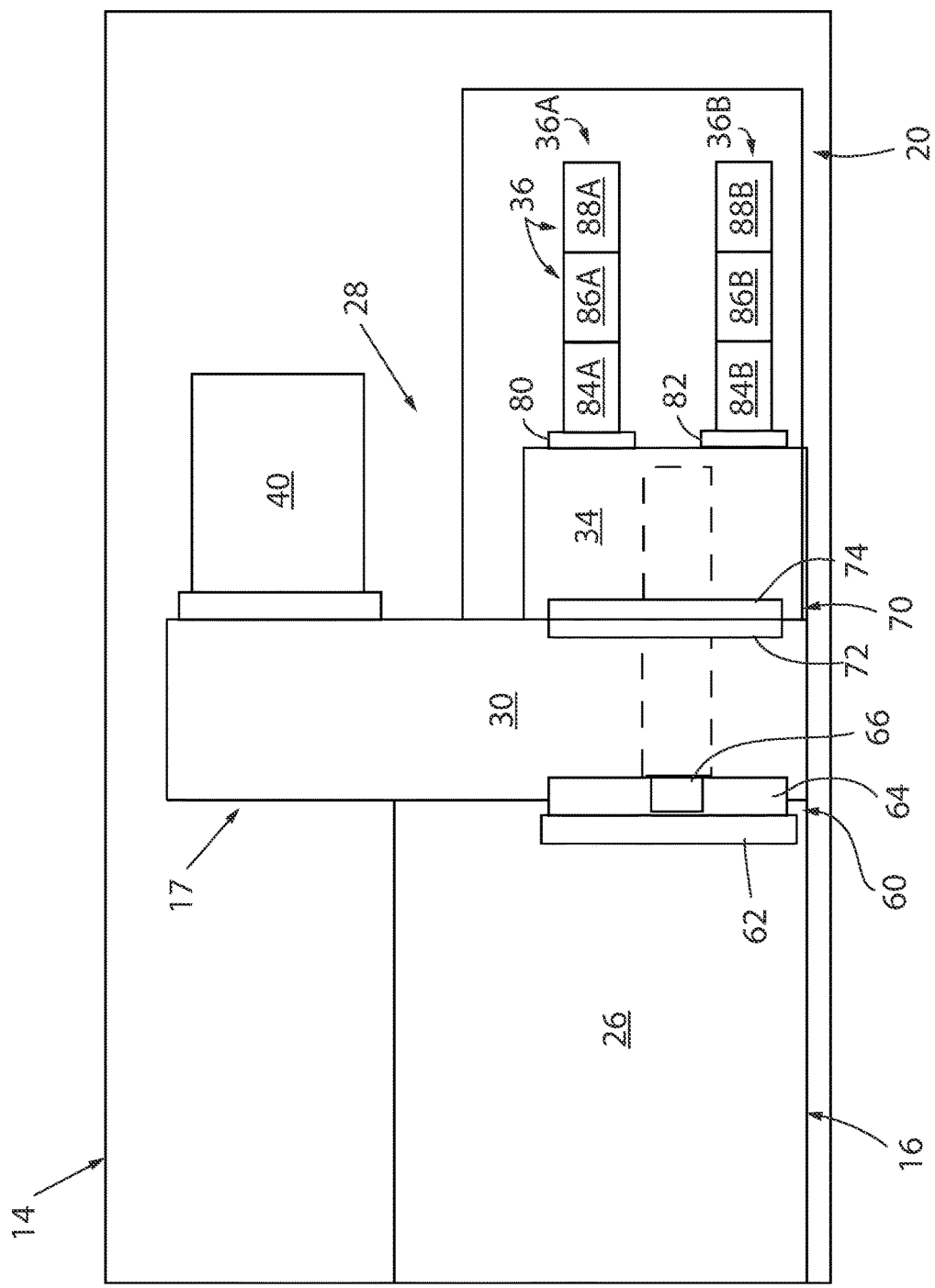
FIG. 5 is a schematic illustration of a hybrid powertrain system, according to another preferred embodiment.

Referring now to FIG. 5, within hybrid PTI/PTO system 17, an input arrangement 60 is defined between and connects respective rotating components of the engine 26 and PTI/PTO gearbox 30, shown here as the engine's flywheel 62 and a coupler 64 that includes a passive clutch such as a one-way clutch or sprag clutch, represented as clutch 66. An output arrangement 70 is defined between and connects respective rotating components of the PTI/PTO gearbox 30 and pump drive 36, shown here as the PTI/PTO gearbox's output plate 72 and a coupler 74 at the pump drive's 34 input end. The pump(s) 36 are mounted to an output end of pump drive 34. A pair of pump pads 80, 82 are shown at the pump drive's 34 output end, each supporting multiple hydraulic pumps as a stacked-pump arrangement. Pump stack 36A is shown with three pumps 84A, 86A, 88A mounted to pump pad 80. Pump stack 36B is shown with three pumps 84B, 86B, 88B mounted to pump pad 82.

Figure 6:
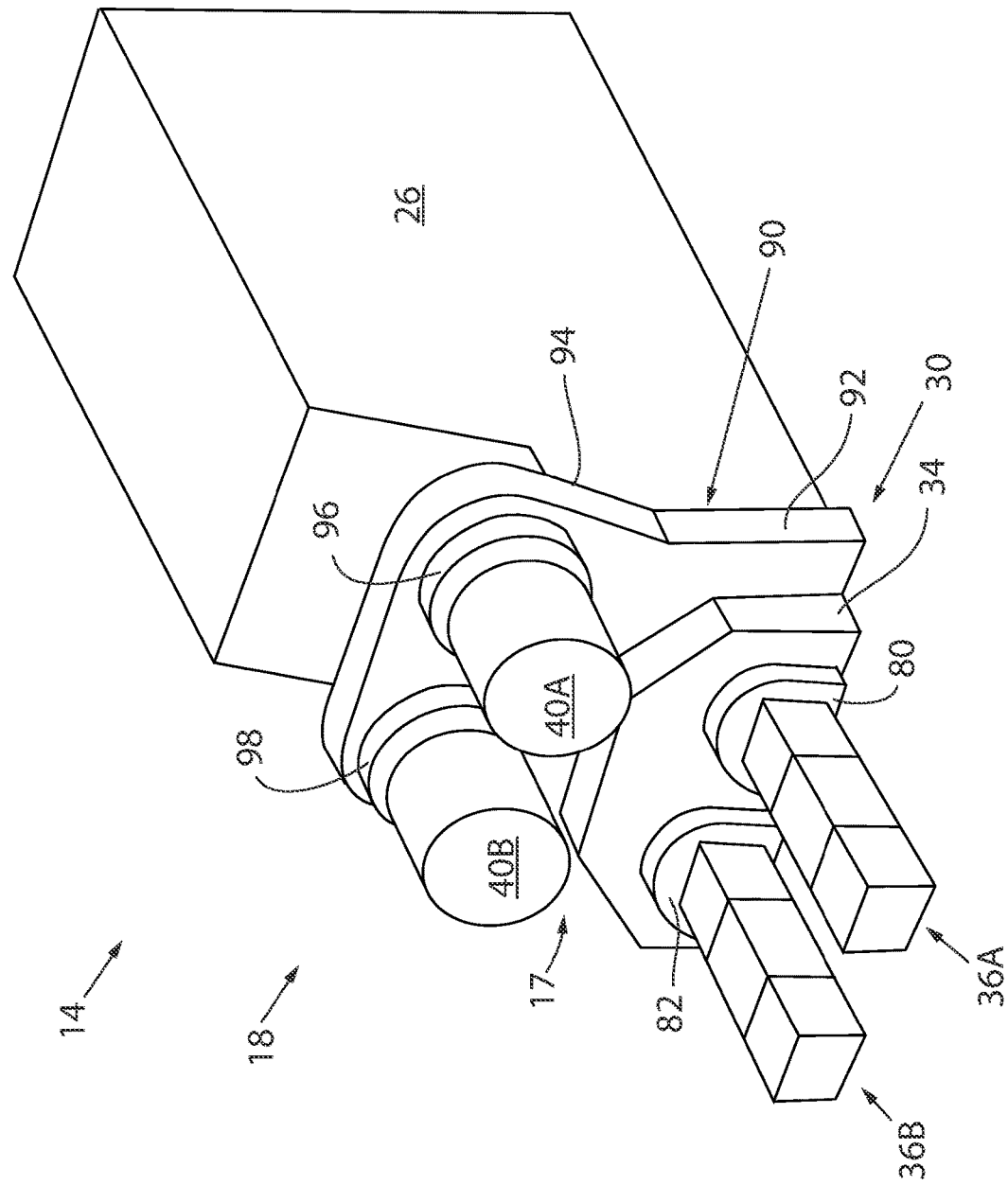
FIG. 6 is a schematic pictorial view of portions of the hybrid powertrain system, according to a further preferred embodiment.

Referring now to FIG. 6, PTI/PTO gearbox 30 is shown defining a tower 90 with a lower section 92 that is sandwiched between engine 26 and pump drive 34 and an upper section 94 that extends upwardly from the lower section 92 and is shown here supporting multiple electric motors as prime movers. A pair of motor adapters 96, 98 are connected to the tower's upper section 94 and support a pair of electric motors 40A, 40B.

Figure 7:
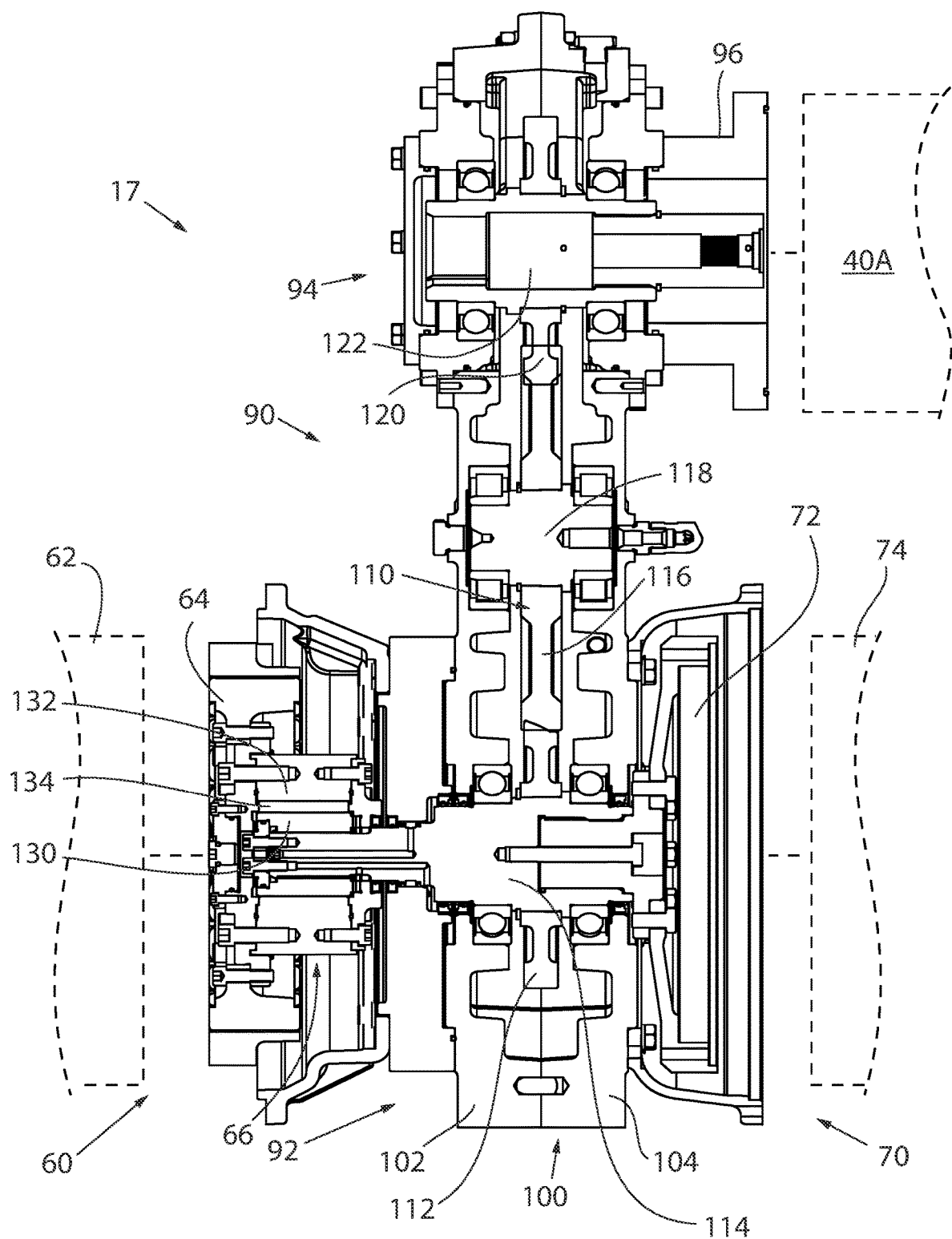
FIG. 7 is a cross-sectional view of portions of a hybrid PTI/PTO (power-take-in/power-take-off) system, according to a further preferred embodiment.

Referring now to FIG. 7, PTI/PTO gearbox 30 is shown with a two-piece case or housing 100, with front housing segment 102 that faces toward engine 26 (FIG. 6) and rear housing segment 104 that faces toward pump drive 34 (FIG. 6). The housing 100 encloses a geartrain 110 that constantly meshes and includes a main gear 112 that is splined, keyed, or otherwise mounted for rotation in unison with main shaft 114. Intermediate gear 116 meshes with main gear 112 and is supported on intermediate shaft 118. Upper gear 120 meshes with intermediate gear 116 and is splined, keyed, or otherwise mounted for rotation in unison with upper shaft 122. Although only one upper gear 120 and upper shaft 122 are shown here, it is understood that the number of paired upper gears/shafts corresponds to the number of motors 40 supported by the tower's upper section 94 for a particular implementation.

Still referring to FIG. 7, coupler 64 may be a cushion-type coupler, such as a RBD (rubber block drive) coupler that provides a flexible, elastic, or shock-absorbing connection between the engine's flywheel 62 and the PTI/PTO gearbox's main shaft 114. Clutch 66 is shown as a sprag clutch that interconnects the coupler 64 to main shaft 114, which is configured to allow the main shaft 114 to overrun the coupler 64 and correspondingly also the engine's flywheel 62. Clutch 66 has an inner race 130 that is splined, keyed, or otherwise mounted for rotation in unison main shaft 114. An outer race 132 is provides a mounting structure to which the coupler 64 is connected, shown here by way of fasteners, so that the outer race 132 and coupler 64 are locked into rotational unison with each other. Selectively locking components such as wedges or sprags 134 are housed between the clutch's inner and outer races 130, 132 so that the sprags the relative rotation of the inner and outer races 130, 132 in one direction is permitted to disengage the races from each other while rotation in the opposite direction wedges the sprags 134 between the inner and outer races 130, 132 to lock them into rotational unison and transmit torque between the inner and outer races 130, 132. This allows the main shaft 114 to rotate at least as fast as the rotation of the flywheel 62 and coupler 64, while allowing the main shaft 114 to rotate faster than or overrun the flywheel 62 and coupler 64 without transmitting torque in that upstream direction.

Still referring to FIG. 7, hybrid PTI/PTO system 17 is able to passively input torque from multiple prime movers, such as engine 26 (FIG. 6), motor 40A (FIG. 6), and motor 40B (FIG. 6), individually or in combination(s) for powering hydraulic system 20 (FIG. 5). Furthermore, through geartrain 110, besides driving as prime movers, each of the motors 40A, 40B can be driven as a generator for recharging the battery 42 (FIG. 1). This can be done either by transmitting power from the PTI/PTO system's input to rotate the motor(s) 40A, 40B as a generator(s) or by transmitting power from the PTI/PTO system's output to rotate the motor(s) 40A, 40B as a generator(s).

Referring now generally to FIGS. 8-21, control system 50 (FIGS. 1-4) controls operation of the motors 40A, 40B, to place them in different operational modes to achieve the particular performance characteristics of hybrid power system 14 based on the power delivery and/or power generation needs of machine 10 (FIGS. 1-4).

Referring generally to the FIGS. 8-15, various operational states of components or systems are shown that correspond to the modes in which hybrid power system 14 delivers power, for example, for use by the working system 19 to act on a load or otherwise perform work, depending on the particular configuration of machine 10 (FIGS. 1-4). Power delivery modes are represented by the arrow(s) directed out of the hybrid power system 14, toward load/work 12 (FIGS. 9-15).

Figure 9:
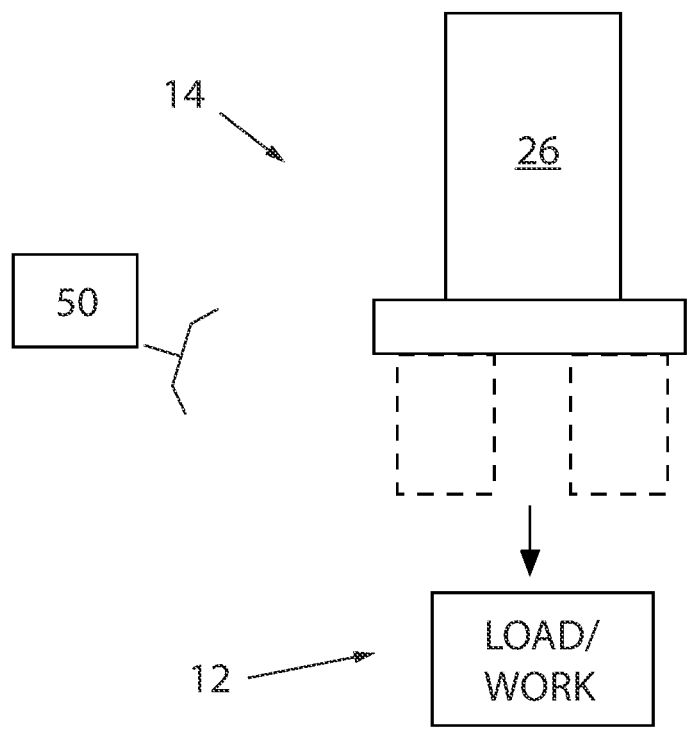
FIGS. 9-21 are schematic representations of various operational states of portions of the hybrid powertrain system, according to the preferred embodiments.
Figure 10:
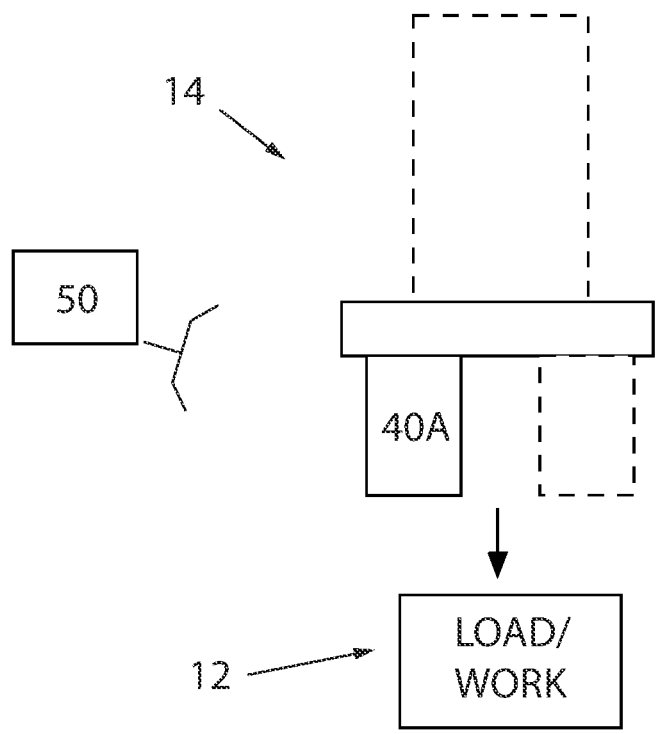
Figure 11:
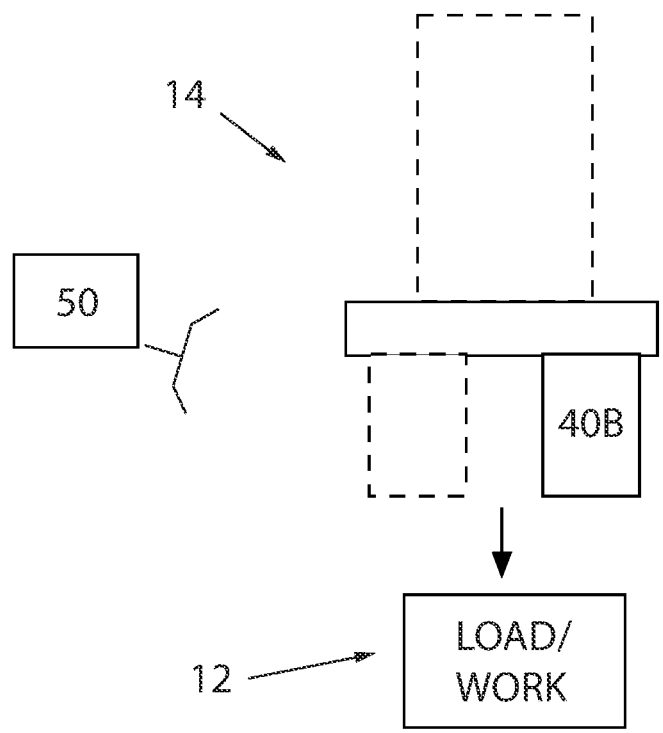
Figure 12:
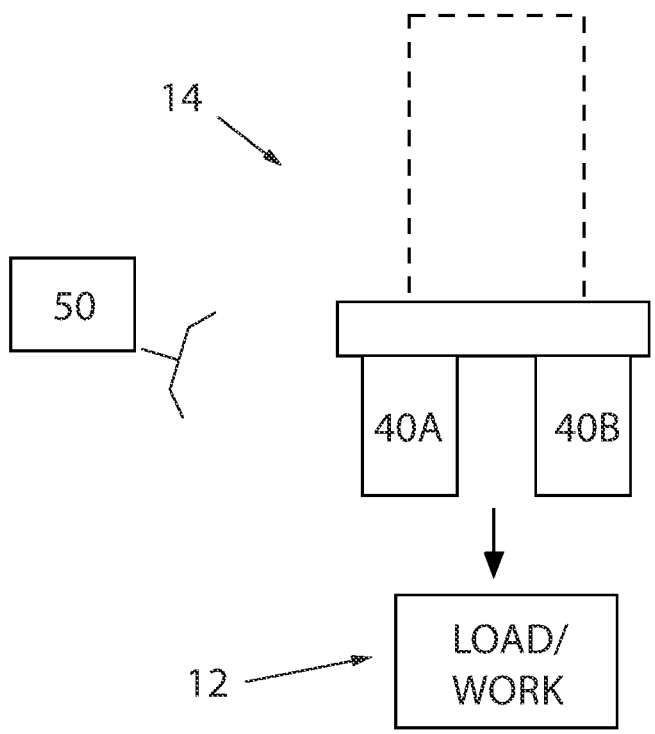

Referring now to FIGS. 8 and 9, in one power delivery mode, the hybrid power system 14 defines an IC engine power delivery mode for performing work with the machine 10 (FIGS. 1-4). In the IC engine power delivery mode, the engine 26 is active and both of the motors 40A, 40B are inactive. Referring now to FIGS. 8 and 10-12, in another power delivery mode, the hybrid power system 14 defines an electric power delivery mode for performing work with the machine 10 (FIGS. 1-4). FIG. 10 shows only motor 40A energized and delivering power. This provides a first single motor full electric mode in which a first one of the pair of electric motors solely provides the power to the working system 19 (FIGS. 1-4). FIG. 11 shows only motor 40B energized and delivering power. This provides a second single motor full electric mode in which the second electric motor solely provides the power to the working system 19 (FIGS. 1-4). FIG. 12 shows both motors 40A, 40B energized and delivering power. This provides a dual motor full electric mode in which the pair of electric motors 40A, 40B simultaneously provides the power to the working system 19 (FIGS. 1-4).

Figure 13:
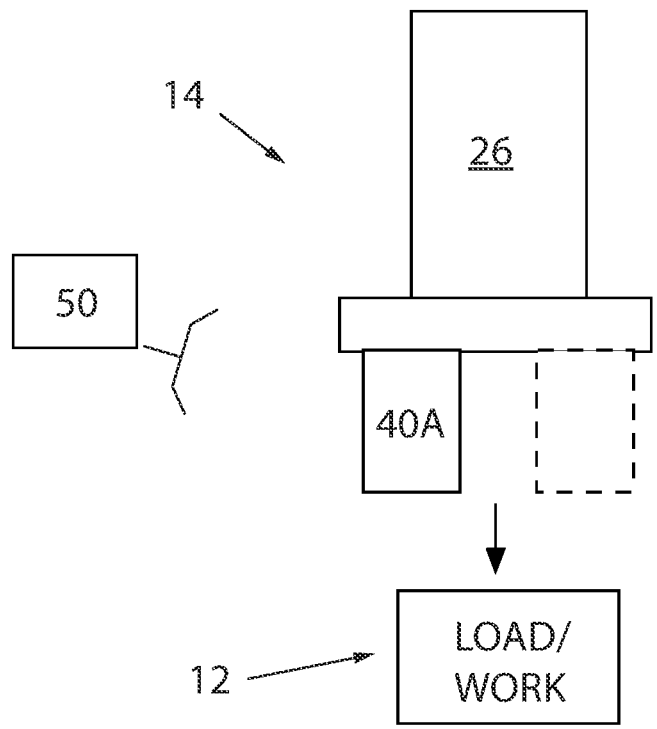
Figure 14:
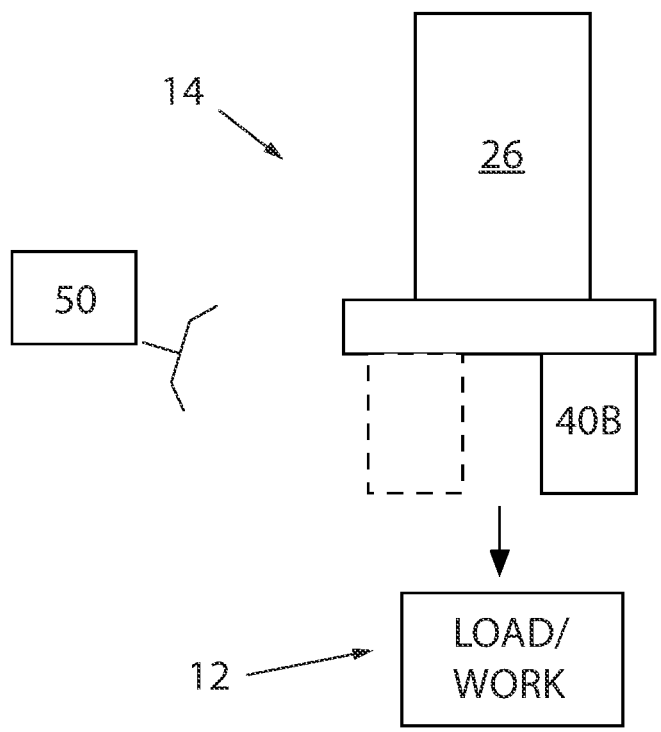
Figure 15:
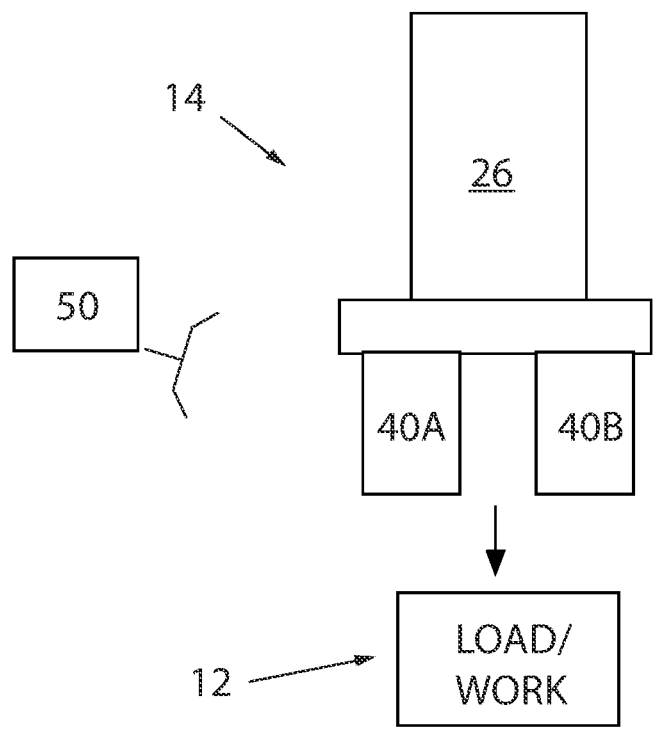

Referring now to FIGS. 8 and 13-15, in another power delivery mode, the hybrid power system 14 defines a hybrid power delivery mode for performing work with the machine 10 (FIG. 1-4). FIG. 13 shows engine 26 and motor 40A delivering power. This provides a first single motor hybrid mode in which the IC engine 26 provides power, with a first one of the electric motors 40A providing supplemental power to the working system 19 (FIGS. 1-4). FIG. 14 shows engine 26 and motor 40B delivering power. This provides a second single motor hybrid mode in which the second electric motor 40B provides power to supplement the IC engine's 26 power, for powering the working system 19 (FIGS. 1-4). FIG. 15 shows engine 26 and both motors 40A, 40B delivering power. This provides a dual motor hybrid mode in which the IC engine 26 and both of the electric motors 40A, 40B simultaneously provide power to the working system 19 (FIGS. 1-4).

Referring generally to the FIGS. 8 and 16-21, various operational states of components or systems are shown that correspond to the modes in which hybrid power system 14 generates power, for example, for use by the electrical system 18 (FIGS. 1-4) to recharge the battery 42. Power generation modes are represented by the arrow(s) directed out of the hybrid power system 14, toward battery 42 (FIGS. 16-21).

Figure 16:
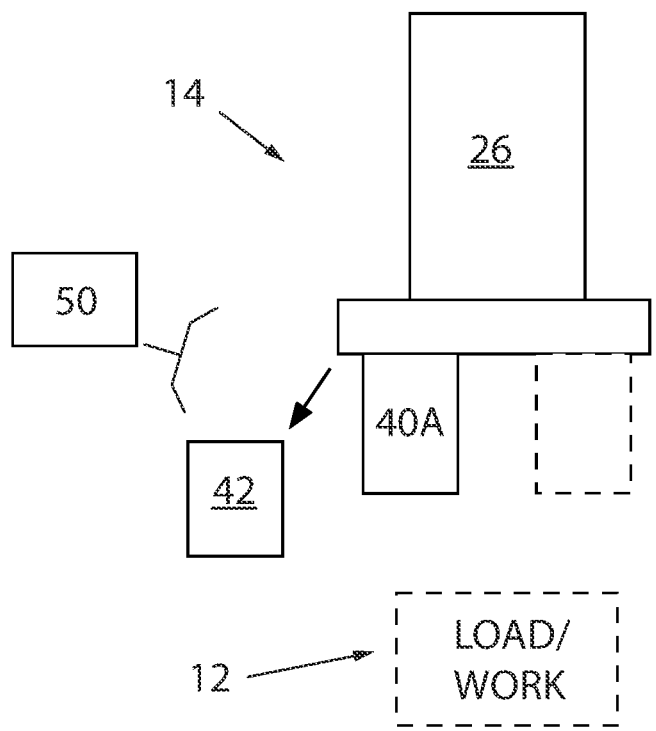
Figure 17:
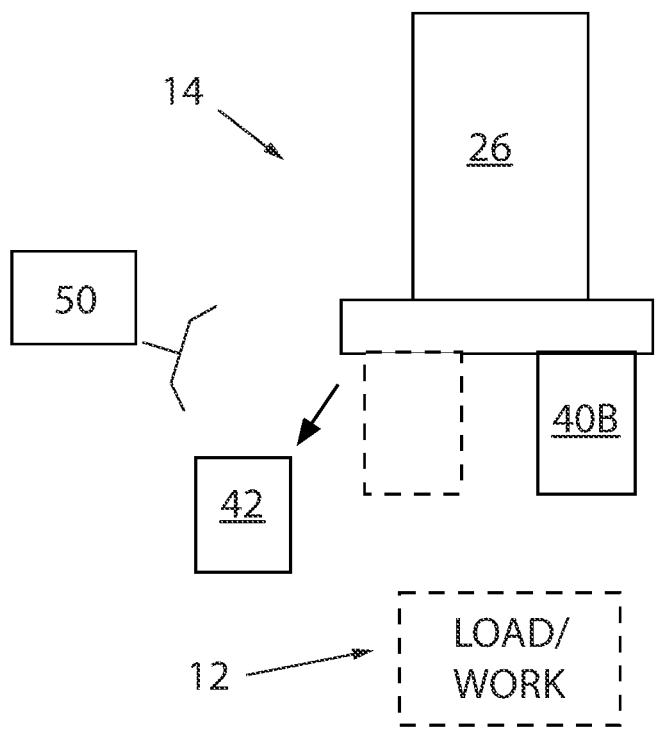
Figure 18:
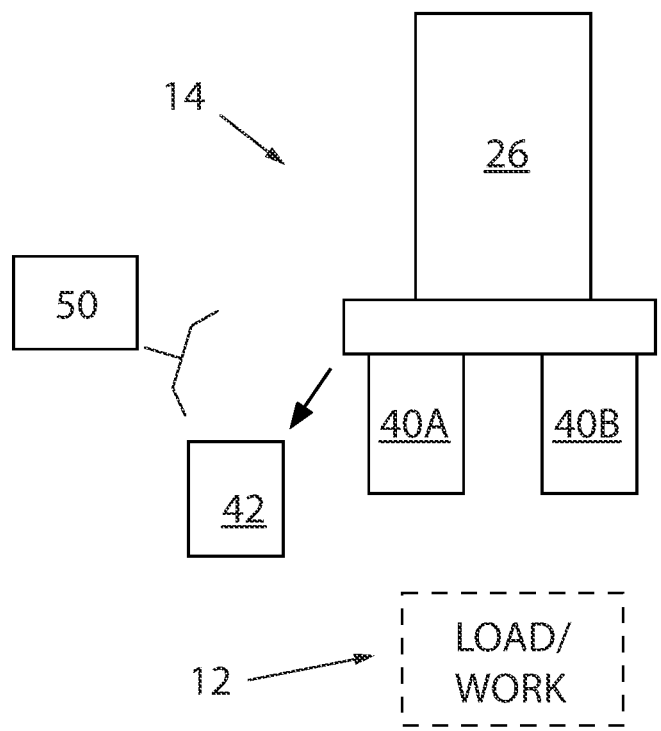

Referring now to FIGS. 8 and 16-18, in one power generation mode, the hybrid power system 14 is controlled by control system 50 to use the engine 26 as a prime mover to drive the motor(s) as a generator(s) to create electrical power, which may be performed as a stand-alone power generation session or while performing work with the working system 19 (FIG. 1-4). FIG. 16 shows engine 26 driving motor 40A as a generator, which charges battery 42. This provides a first single motor/IC engine generator mode in which the IC engine 26 drives a first one of the pair of electric motors 40A to generate electrical power. FIG. 17 shows engine 26 driving motor 40B as a generator, which charges battery 42. This provides a second single motor/IC engine generator mode in which the IC engine 26 drives the second electric motor 40B to generate electrical power. FIG. 18 shows engine 26 driving both motors 40A, 40B as generators, charging battery 42. This provides a dual motor/IC engine generator mode in which the IC engine drives both of the first and second motors to generate electrical power.

Figure 19:
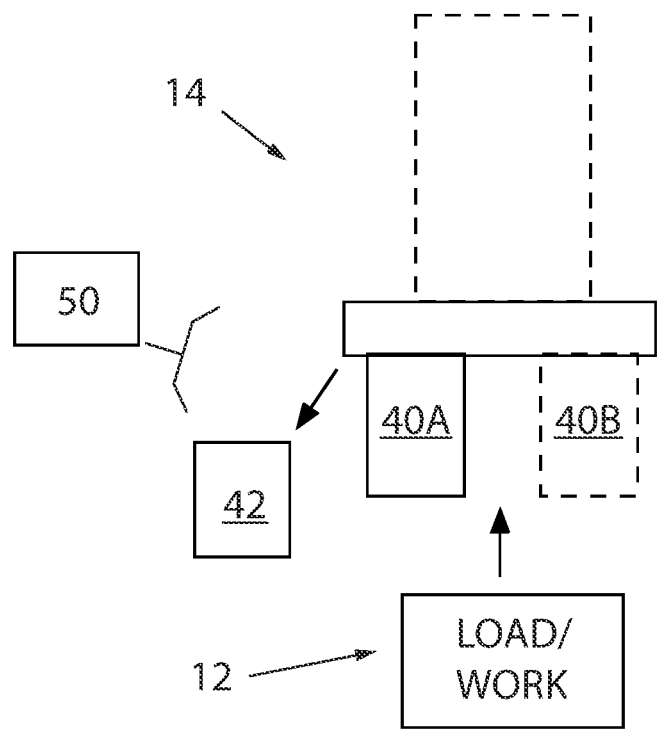
Figure 20:
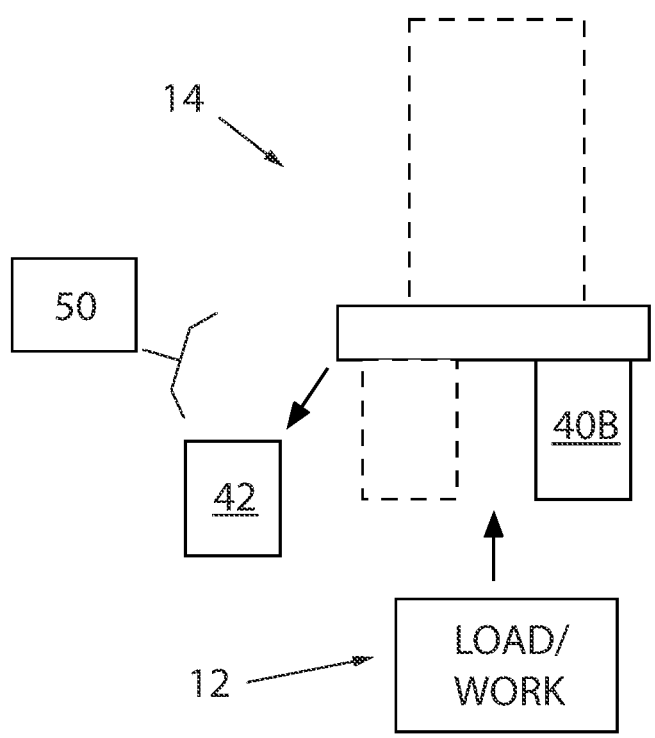
Figure 21:
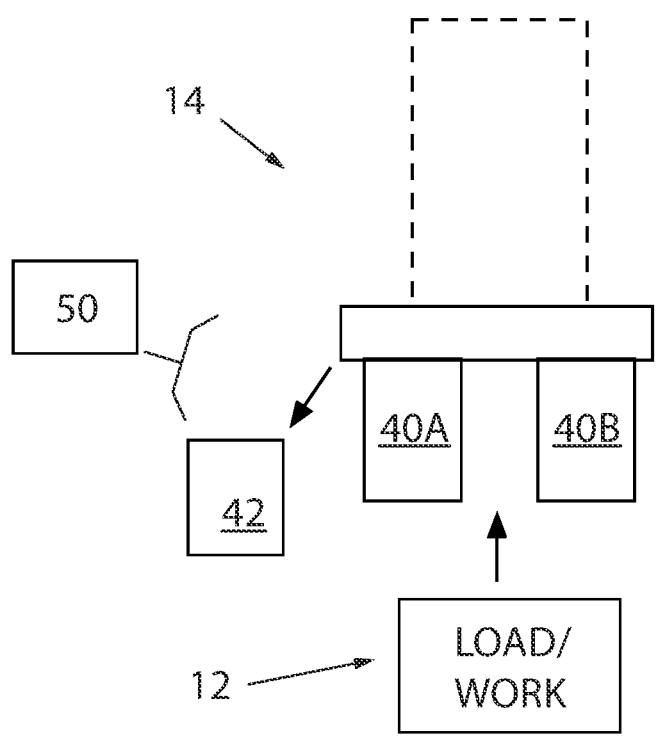

Referring now to FIGS. 8 and 19-21, in another power generation mode, as a regenerative-type generation mode, the hybrid power system 14 is controlled by control system 50 to use the motors 40A, 40B as regenerative brakes, so that slowing momentum of a load of working system 19 (FIGS. 1-4) drives the motor(s) through an output of the PTI/PTO gearbox 30, to rotate them as generators. FIG. 19 shows load control or slowing of load/work 12, using its momentum or energy to drive motor 40A as a generator, which charges battery 42. This provides a first single motor regenerative mode in which energy from a load 12 drives a first electric motor 40A to generate electrical power. FIG. 20 shows load control or slowing of load/work 12, using its momentum or energy to drive motor 40B as a generator, which charges battery 42. This provides a second single motor regenerative mode in which energy from a load 12 drives the second electric motor 40B to generate electrical power. FIG. 21 shows load control or slowing of load/work 12, using its momentum or energy to drive both motors 40A, 40B as generators, charging battery 42. This provides a dual motor regenerative mode in which the load 12 drives motors 40A, 40B to generate electrical power.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:

1. A hybrid industrial machine powertrain of an industrial machine, comprising:
   an IC (internal combustion) engine;
   at least one electric motor;
   a working system of the industrial machine configured to be powered by at least one of the IC engine and the at least one electric motor;
   a PTI/PTO (power-take-in/power-take-off) system configured to transmit power from each of the IC engine and the at least one electric motor; and
      wherein the PTI/PTO system is configured to passively couple or uncouple power transmission from the IC engine to the working system based on an operational state of the at least one electric motor;
   at least one hydraulic pump configured to be powered by at least one of the IC engine and the at least one electric motor;
      wherein the PTI/PTO system is configured to passively couple or uncouple power transmission from the IC engine to the at least one hydraulic pump based on the operational state of the at least one electric motor;
      wherein the PTI/PTO system passively uncouples power transmission from the IC engine to the at least one hydraulic pump as a function of a rotational speed of the at least one electric motor;
   a PTI/PTO gearbox with a geartrain that includes a main shaft and defines a tower with a tower lower section and a tower upper section;
   a coupler that transmits power between the IC engine and the main shaft;
   a one-way clutch arranged downstream of the IC engine and that interconnects the coupler and the main shaft;
      wherein the one-way clutch accommodates an overrunning condition in which the at least one electric motor rotates at a greater speed than the IC engine; and
   the at least one electric motor is defined by a pair of electric motors that are supported by the upper end of the tower upper section.

2. The hybrid industrial machine powertrain of claim 1, further comprising:
   a pump drive mounted to an output end of the tower lower section, with the at least one hydraulic pump mounted to the pump drive.

3. The hybrid industrial machine powertrain of claim 2, wherein the pump drive defines an output end that provides a first pump pad and a second pump pad and wherein the at least one hydraulic pump includes a first hydraulic pump mounted to the first pump pad and a second hydraulic pump mounted to the second pump pad.

4. The hybrid industrial machine powertrain of claim 3, wherein:
   the first hydraulic pump is defined within a first pump stack of multiple hydraulic pumps mounted to the first pump pad pump; and
   the second hydraulic pump is defined within a second pump stack of multiple hydraulic pumps mounted to the second pump pad.

5. The hybrid industrial machine powertrain of claim 1, wherein:
   the hybrid industrial machine powertrain defines multiple power delivery operational modes, including:
      an IC engine power delivery mode in which the IC engine solely provides the power to the working system;
      a first single motor full electric mode in which a first one of the pair of electric motors solely provides the power to the working system;
      a second single motor single motor full electric mode in which a second one of the pair of electric motors solely provides the power to the working system;
      a dual motor full electric mode in which the pair of electric motors simultaneously provides the power to the working system.

6. The hybrid industrial machine powertrain of claim 1, wherein:
   the hybrid industrial machine powertrain defines multiple power delivery operational modes, including:
      an IC engine power delivery mode in which the IC engine solely provides the power to the working system;
      a first single motor hybrid mode in which the IC engine provides power to the working system and a first one of the pair of electric motors provides supplemental power to the working system;
      a second single motor single motor hybrid mode in which the IC engine provides power to the working system and a second one of the pair of electric motors provides supplemental power to the working system; and a dual motor hybrid mode in which the IC engine provides power to the working system the pair of electric motors simultaneously provide supplemental power to the working system.

7. The hybrid industrial machine powertrain of claim 1, wherein:
the hybrid industrial machine powertrain defines multiple power generation modes, including:
a first single motor/IC engine generator mode in which the IC engine drives a first one of the pair of electric motors to generate electrical power;
a second single motor/IC engine generator mode in which the IC engine drives a second one of the pair of electric motors to generate electrical power; and
a dual motor/IC engine generator mode in which the IC engine drives both of the first and second motors to generate electrical power.

8. The hybrid industrial machine powertrain of claim 1, wherein:
the hybrid industrial machine powertrain defines multiple power generation modes, including:
a first single motor regenerative mode in which energy from a load drives a first one of the pair of electric motors to generate electrical power;
a second single regenerative mode in which energy from a load drives a second one of the pair of electric motors to generate electrical power; and
a dual motor regenerative mode in which the load drives both of the first and second motors to generate electrical power.

9. The hybrid industrial machine powertrain of claim 1, wherein:
industrial machine powertrain defines:
multiple power delivery operational modes, including:
an IC engine power delivery mode in which the IC engine solely provides the power to the working system;
a first single motor hybrid mode in which the IC engine provides power to the working system and a first one of the pair of electric motors provides supplemental power to the working system;
a second single motor single motor hybrid mode in which the IC engine provides power to the working system and a second one of the pair of electric motors provides supplemental power to the working system;
a dual motor hybrid mode in which the IC engine provides power to the working system the pair of electric motors simultaneously provide supplemental power to the working system;
multiple power generation modes, including:
a first single motor/IC engine generator mode in which the IC engine drives a first one of the pair of electric motors to generate electrical power;
a second single motor/IC engine generator mode in which the IC engine drives a second one of the pair of electric motors to generate electrical power;
a dual motor/IC engine generator mode in which the IC engine drives both of the first and second motors to generate electrical power;
a first single motor regenerative mode in which energy from a load drives a first one of the pair of electric motors to generate electrical power;
a second single regenerative mode in which energy from a load drives a second one of the pair of electric motors to generate electrical power; and
a dual motor regenerative mode in which the load drives both of the first and second motors to generate electrical power.

* * * * *